United States Patent
Takeuchi et al.

(10) Patent No.: US 12,531,256 B2
(45) Date of Patent: Jan. 20, 2026

(54) ELECTRICAL POWER SYSTEM AND ELECTRICAL POWER CONTROL DEVICE

(71) Applicant: HONDA MOTOR CO., LTD., Tokyo (JP)

(72) Inventors: Kento Takeuchi, Saitama (JP); Nobutaka Nakajima, Saitama (JP); Junya Miyazaki, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 918 days.

(21) Appl. No.: 17/689,998

(22) Filed: Mar. 9, 2022

(65) Prior Publication Data
US 2022/0320542 A1     Oct. 6, 2022

(30) Foreign Application Priority Data
Mar. 31, 2021 (JP) ................. 2021-059063

(51) Int. Cl.
*H01M 8/04537* (2016.01)
*B60L 58/33* (2019.01)
(Continued)

(52) U.S. Cl.
CPC ......... *H01M 8/04619* (2013.01); *B60L 58/33* (2019.02); *B60L 58/40* (2019.02);
(Continued)

(58) Field of Classification Search
CPC ........... H01M 8/0494; H01M 8/04619; H01M 8/04373; B60L 58/33; B60L 58/40
See application file for complete search history.

(56) References Cited

U.S. PATENT DOCUMENTS

2010/0273079 A1   10/2010   Hinsenkamp et al.
2018/0339604 A1*  11/2018   Brown .................... B60L 50/90
(Continued)

FOREIGN PATENT DOCUMENTS

| CN | 111525159 A | 8/2020 |
|---|---|---|
| CN | 112297955 A | 2/2021 |

(Continued)

OTHER PUBLICATIONS

English translation of JP Publication 2012-195263, Oct. 2012.*
(Continued)

*Primary Examiner* — Brittany L Raymond
(74) *Attorney, Agent, or Firm* — CKC & PARTNERS CO., LLC

(57) ABSTRACT

To provide an electrical power system and an electrical power control device that make it possible to suppress deterioration of a fuel cell compared to that conventional seen. An electrical power system according to an embodiment includes a fuel cell, a heat source, a heat dissipator, and a controller. The fuel cell is configured to generate electrical power through electrochemical reactions to generate first heat. The heat source operates to generate second heat. The heat dissipator is configured to dissipate the first heat and the second heat. The controller is configured to control the fuel cell to allow, when the heat source is in operation, an amount of the first heat to be equal to or below an available heat dissipation capacity acquired by subtracting an amount of the second heat from a maximum amount of heat to be dissipated from the heat dissipator.

9 Claims, 5 Drawing Sheets

(51) Int. Cl.
*B60L 58/40* (2019.01)
*H01M 8/04029* (2016.01)
*H01M 8/04228* (2016.01)

(52) U.S. Cl.
CPC ... *H01M 8/04029* (2013.01); *H01M 8/04228* (2016.02); *H01M 2250/20* (2013.01)

(56) References Cited

U.S. PATENT DOCUMENTS

2020/0251759 A1    8/2020  Lee
2021/0036342 A1    2/2021  Seo

FOREIGN PATENT DOCUMENTS

| | | | |
|---|---|---|---|
| JP | 2002-083622 | * | 3/2002 |
| JP | 2002083622 A | | 3/2002 |
| JP | 2011503812 A | | 1/2011 |
| JP | 2012-195263 | * | 10/2012 |
| JP | 2012195263 A | | 10/2012 |
| JP | 2016-186919 | * | 10/2016 |
| JP | 2016186919 A | | 10/2016 |
| JP | 2020522419 A | | 7/2020 |
| WO | 2018217836 A1 | | 11/2018 |

OTHER PUBLICATIONS

English translation of JP Publication 2002-083622, Mar. 2002.*
English translation of JP Publication 2016-186919, Oct. 2016.*
Office Action issued Dec. 3, 2025 in the CN Patent Application No. 202210233306.6.

* cited by examiner

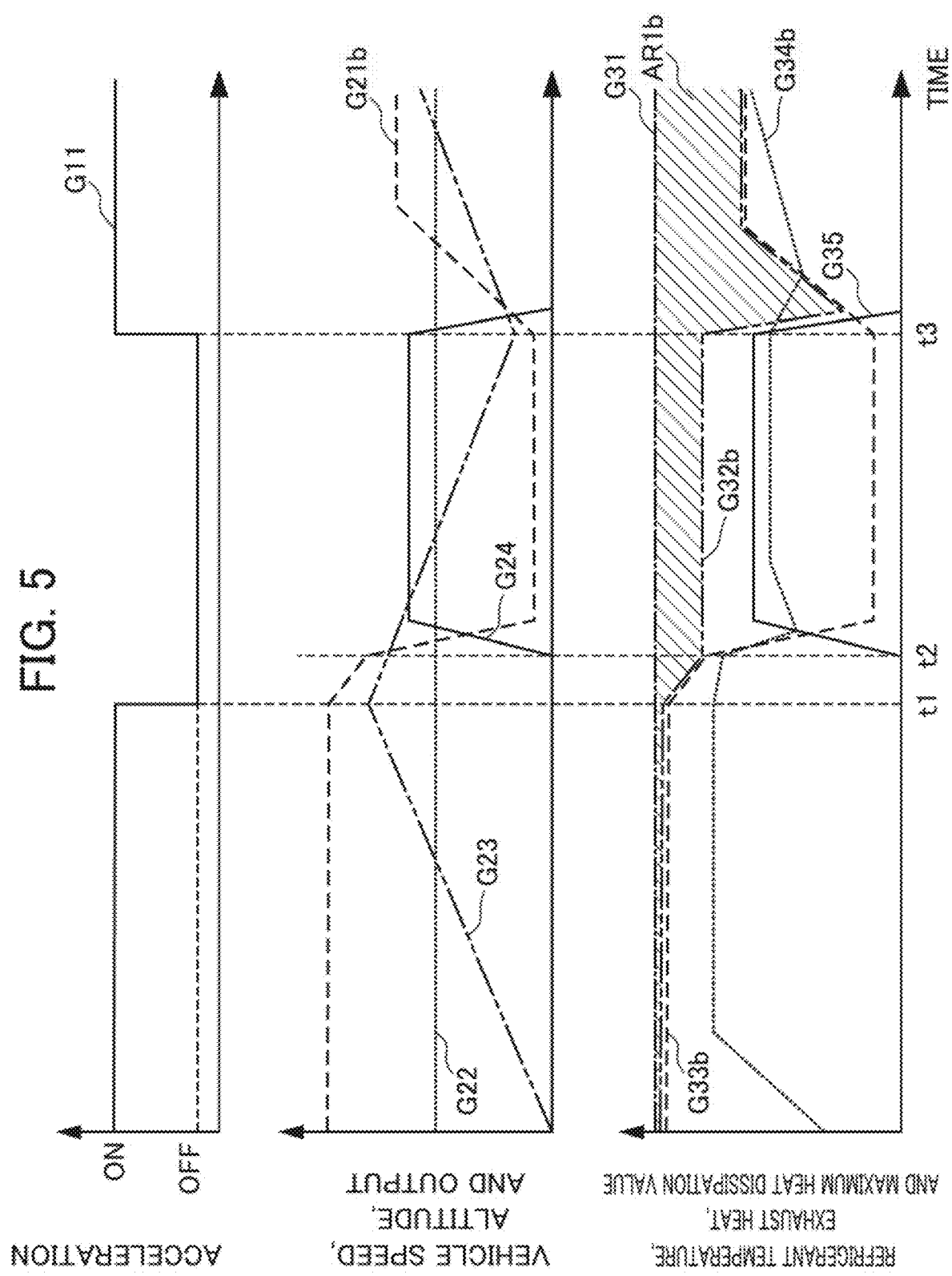

ELECTRICAL POWER SYSTEM AND ELECTRICAL POWER CONTROL DEVICE

This application is based on and claims the benefit of priority from Japanese Patent Application No. 2021-059063, filed on 31 Mar. 2021, the content of which is incorporated herein by reference.

BACKGROUND OF THE INVENTION

Field of the Invention

The present invention relates to an electrical power system and an electrical power control device.

Related Art

There are devices such as motor vehicles that include fuel cells and that use the fuel cells to operate. Such a device may include a heat source such as a retarder that operates to generate heat. In such a device including such a heat source, as fuel cells conventionally generate heat, the fuel cells are caused to turn into an idle state to stop operating while the heat source is in operation, for example, to suppress an amount of heat to be generated. One of the reasons why this is the case is that, when the heat source and the fuel cells both generate heat, the generated heat may not be fully dissipated.

Patent Document 1: Japanese Unexamined Patent Application (Translation of PCT Application), Publication No. 2011-503812

SUMMARY OF THE INVENTION

However, if the fuel cells are caused to stop operating each time the heat source is started to operate, there may be a great fluctuation in amount of electrical power to be generated in the fuel cells. An object of an embodiment of the present invention is to provide an electrical power system and an electrical power control device that make it possible to suppress deterioration of a fuel cell compared to that conventional seen.

An electrical power system according to an embodiment includes a fuel cell, a heat source, a heat dissipator, and a controller. The fuel cell is configured to generate electrical power through electrochemical reactions to generate first heat. The heat source operates to generate second heat. The heat dissipator is configured to dissipate the first heat and the second heat. The controller is configured to control the fuel cell to allow, when the heat source is in operation, an amount of the first heat to be equal to or below an available heat dissipation capacity acquired by subtracting an amount of the second heat from a maximum amount of heat to be dissipated from the heat dissipator.

According to the present invention, it is possible to suppress deterioration of a fuel cell compared to that conventional seen.

BRIEF DESCRIPTION OF THE DRAWINGS

FIG. 5 illustrates graphs, as an example, of changes over time in state and others of each component of a conventional motor vehicle.

DETAILED DESCRIPTION OF THE INVENTION

Figure 1:
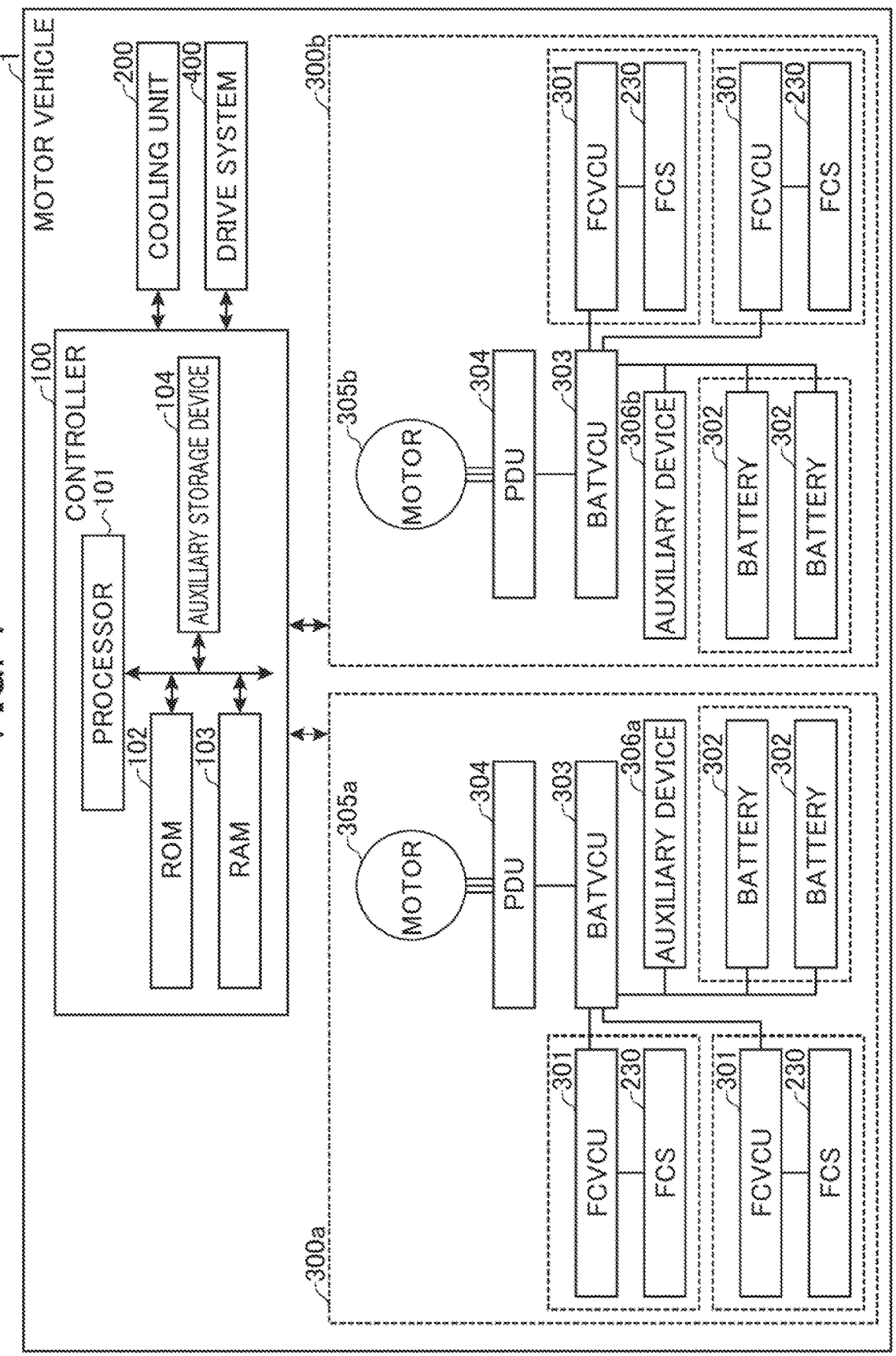
FIG. 1 is a block diagram illustrating an example of a main circuit configuration of a motor vehicle according to an embodiment.

A power supply group according to an embodiment will now be described herein with reference to the accompanying drawings. Note that, in the drawings used to describe below the embodiment, some configurations may be omitted for the purpose of description. Furthermore, in the drawings and the specification, identical reference numerals represent similar or identical elements. FIG. 1 is a block diagram illustrating an example of a main circuit configuration of a motor vehicle 1 according to the embodiment.

The motor vehicle 1 represents, for example, a motor vehicle that uses fuel cells as a driving power source for driving (traveling), such as a fuel cell vehicle (FCV). The motor vehicle 1 includes, as an example, a controller 100, a cooling unit 200, a power supply group 300, and a drive system 400. The controller 100, the cooling unit 200, and the power supply group 300 configure an example of an electrical power system mounted on the motor vehicle 1. Furthermore, the motor vehicle 1 represents an example of an electrical power system.

The controller 100 represents, for example, a computer configured to perform processing such as calculations and controls necessary for operating the motor vehicle 1. The controller 100 is configured to control, for example, the cooling unit 200, the power supply group 300, and the drive system 400. The controller 100 includes, as an example, a processor 101, a read-only memory (ROM) 102, a random-access memory (RAM) 103, and an auxiliary storage device 104. Note that the controller 100 represents an example of an electrical power control device.

The processor 101 represents a central part of the controller 100, and is configured to perform various calculations and processing. The processor 101 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). The processor 101 may otherwise be a combination of some of them. The processor 101 controls each component to achieve various functions of the motor vehicle 1 based on programs, such as firmware, system software, and application software, stored in the ROM 102 or the auxiliary storage device 104, for example. Furthermore, the processor 101 executes processing described later based on the programs. Note that some or all of the programs may be incorporated into a circuit of the processor 101.

The ROM 102 and the RAM 103 represent main storage devices for the controller 100. The ROM 102 represents a non-volatile memory mainly used to read data. The ROM 102 is configured to store firmware, for example, among the programs described above. Furthermore, the ROM 102 further stores, for example, data that the processor 101 uses for performing various processing. The RAM 103 represents a memory used to read and write data. The RAM 103 is utilized, for example, as a work area for storing data that the processor 101 uses on a temporal basis for performing various processing. The RAM 103 typically represents a volatile memory.

The auxiliary storage device 104 represents an auxiliary storage device for the controller 100. The auxiliary storage device 104 is, for example, an electric erasable programmable read-only memory (EEPROM), a hard disk drive (HDD), or a flash memory. The auxiliary storage device 104 is configured to store, for example, system software and application software, among the programs described above. Furthermore, the auxiliary storage device 104 further stores, for example, data that the processor 101 uses for performing various processing, data generated through the processing in the processor 101, and various set values.

Figure 2:
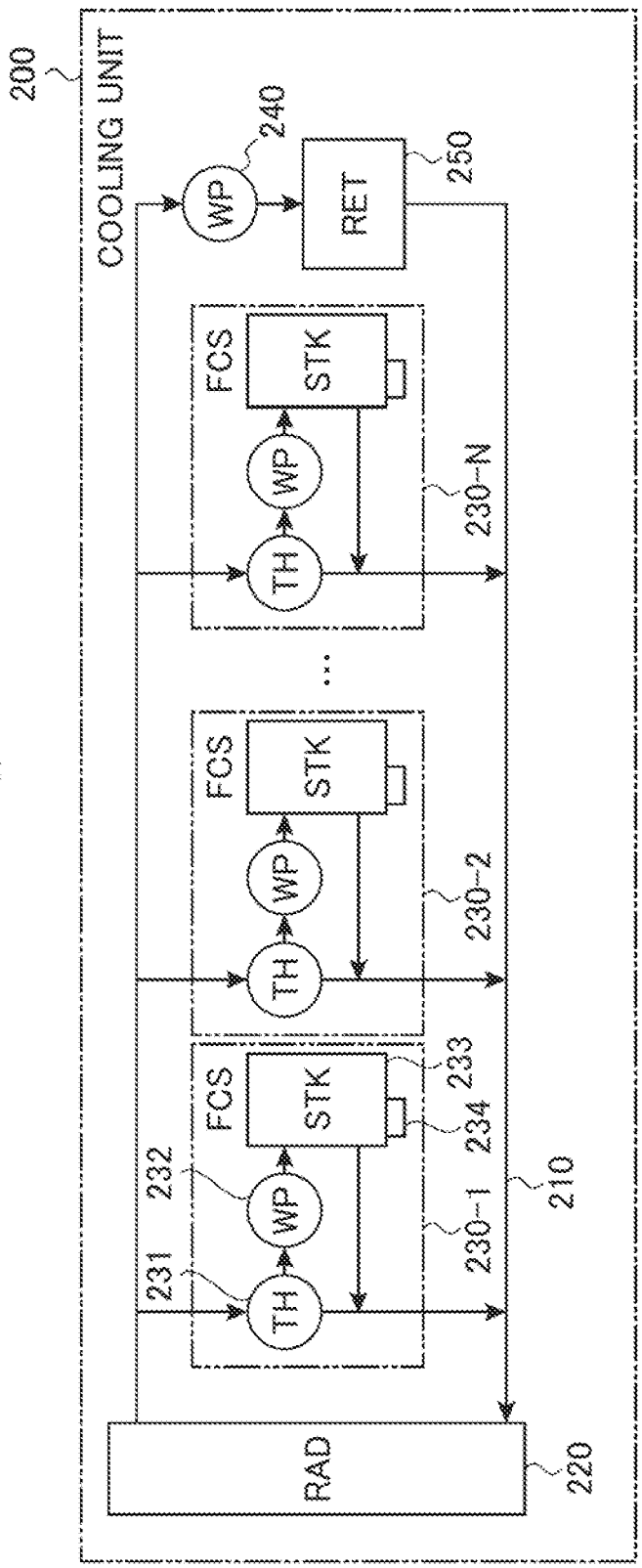
FIG. 2 is a block diagram illustrating an example of a main configuration of a cooling unit illustrated in FIG. 1.

FIG. 2 is a block diagram illustrating an example of a main configuration of the cooling unit 200. The cooling unit 200 represents a component configured to cool each component of the motor vehicle 1. The cooling unit 200 includes, as an example, a cooling circuit 210, a radiator (RAD) 220, a fuel cell system (FCS) 230, a water pump (WP) 240, and a retarder (RET) 250.

The cooling circuit 210 represents, for example, a fluid circuit in which liquid such as coolant (This will be hereinafter referred to as a "cooling fluid".) circulates and flows. The cooling circuit 210 is configured to cool and warm up a fuel cell stack 233, and to cool the retarder 250, as the cooling fluid transfers heat, for example. After the cooling fluid exits the radiator 220, the cooling fluid passes through the FCS 230 or the retarder 250 and enters the radiator 220, for example.

As a heat sink and a fan dissipate heat, for example, the radiator 220 cools the cooling fluid in the radiator 220. The cooling circuit 210 and the radiator 220 represent an example of a heat dissipator configured to dissipate heat generated in the fuel cell stack 233 and heat generated in the retarder 250.

As for the FCS 230, the cooling unit 200 includes one FCS 230 or a plurality of FCSs 230. FIG. 2 illustrates, as an example, the N number of FCSs 230, i.e., FCS 230-1 to FCS 230-N. Note that N represents an integer of 1 or greater. The FCS 230 represents a power supply including, for example, the fuel cell stack 233 and various devices used to operate the fuel cell stack 233. The FCS 230 is configured to output electrical power that the fuel cell stack 233 outputs. The electrical power is, for example, supplied to each component of the motor vehicle 1, and is used to charge a battery 302 and to operate each component of the motor vehicle 1, such as to drive a motor 305. The FCS 230 includes, as an example, a thermostat valve (WP) 231, a water pump (WP) 232, the fuel cell stack (STK) 233, and a temperature sensor 234. Furthermore, the FCS 230 may include, for example, an auxiliary device configured to supply fuel gas and oxidant gas to the fuel cell stack as a device for operating the fuel cell stack.

The thermostat valve 231 is configured to control the flow of the cooling fluid in the FCS 230 to allow the cooling fluid to exit the FCS 230 or to flow into the fuel cell stack 233.

The water pump 232 is configured to increase a flow speed of the cooling fluid flowing from the thermostat valve 231 to the fuel cell stack 233.

In the fuel cell stack 233, a plurality of fuel cells are stacked with each other. The fuel cell stack 233 is configured to generate electrical power through electrochemical reactions of fuel gas and oxidant gas, for example, and to output the electrical power. The electrical power generated in the fuel cell stack 233 is used to drive the motor 305 and to charge the battery 302. As the fuel cell stack 233 generates electrical power, the fuel cell stack 233 generates heat. Therefore, the fuel cell stack 233 needs to be cooled. Total heat generated in the fuel cell stack 233 or a plurality of fuel cell stacks 233 that the motor vehicle 1 includes represents an example of first heat.

The temperature sensor 234 is configured to measure a temperature of the fuel cell stack 233. The temperature sensor 234 then outputs a measurement result of the temperature.

The water pump 240 is configured to increase the flow speed of the cooling fluid flowing from the radiator 220 into the retarder 250.

As the retarder 250 brakes the rotative force of the rotation shaft of the drive system 400, it is possible to reduce a rotating speed of the rotation shaft, for example. With the retarder 250, it is therefore possible to decelerate the motor vehicle 1. The retarder 250 generates heat while it is in operation. Therefore, the retarder 250 represents an example of a heat source. Heat generated in the retarder 250 serving as a heat source represents an example of second heat.

Now back to the description of FIG. 1. As for the power supply group 300, the motor vehicle 1 includes one power supply group 300 or a plurality of power supply groups 300. As an example, the motor vehicle 1 illustrated in FIG. 1 includes two power supply groups 300, i.e., a power supply group 300a and a power supply group 300b. The power supply group 300 represents a power supply and destinations to which electrical power that the power supply outputs is to be outputted. The power supply includes, as an example, the FCS 230 and the battery 302. The power supply group 300 includes, as an example, a fuel cell voltage control unit (FCVCU) 301, the battery 302, a battery voltage control unit (BATVCU) 303, a power drive unit (PDU) 304, the motor 305, an auxiliary device 306, and the FCS 230.

The FCVCU 301 represents, for example, a step-up converter configured to adjust a voltage of electrical power that the FCS 230 outputs by stepping up the voltage, and to output the electrical power at the adjusted voltage to the BATVCU 303 and other components. The motor vehicle 1 includes, for example, one FCVCU 301 per one FCS 230.

The battery 302 represents a secondary battery and a power supply configured to supply electrical power to each component of the motor vehicle 1, such as the motor 305 and the auxiliary device 306. The battery 302 is charged with electrical power that the FCS 230 outputs, for example.

The BATVCU 303 represents, for example, a step-up-and-down converter configured to adjust voltages that the battery 302 and the FCVCU 301 output by stepping up or down the voltages, and to output the electrical power at the adjusted voltages to the PDU 304, the auxiliary device 306, and other components. Furthermore, the BATVCU 303 adjusts a voltage of electrical power that the FCVCU 301 outputs to a voltage appropriate for charging the battery 302, and outputs the electrical power at the adjusted voltage to the battery 302.

The PDU 304 represents, for example, an inverter configured to convert a frequency and a voltage of electrical power to be inputted into a frequency and a voltage appropriate for a rotating speed and torque of the motor 305, and to output the electrical power at the converted frequency and the converted voltage to the motor 305.

The motor 305 represents a motor configured to drive the drive system 400 and other components. As for the motor 305, it may be a single motor or a motor group including a plurality of motors. The motor 305 is driven, for example, with electrical power that at least any of the fuel cell stack 233 and the battery 302 outputs. FIG. 1 illustrates the motor 305 in the power supply group 300a as a motor 305a and the motor 305 in the power supply group 300b as a motor 305b. The motor 305 represents an example of a load that operates with electrical power generated by the fuel cell stack 233.

As for the auxiliary device 306, the power supply group 300 includes one auxiliary device 306 or a plurality of auxiliary devices 306. The power supply group 300 includes, for example, the auxiliary device 306 that differs per the power supply group 300. The auxiliary device 306 includes, for example, a power steering, a brake, a cooling fan, a water pump, and a refrigerating machine. FIG. 1 illustrates the auxiliary device 306 in the power supply group 300a as an auxiliary device 306a and the auxiliary device 306 in the power supply group 300b as an auxiliary device 306b. As an example, the power supply group 300a includes, as the auxiliary device 306a, the power steering, the brake, the cooling fan, and other devices. As an example, the power supply group 300b then includes, as the auxiliary device 306b, the cooling fan, the water pump, the refrigerating machine, and other devices.

The drive system 400 represents a section configured to transmit a rotative force that the motor 305 outputs to the drive wheels. The drive system 400 includes, for example, the motor 305, the retarder 250, gears, shafts, the drive wheels, and other components.

Figure 3:
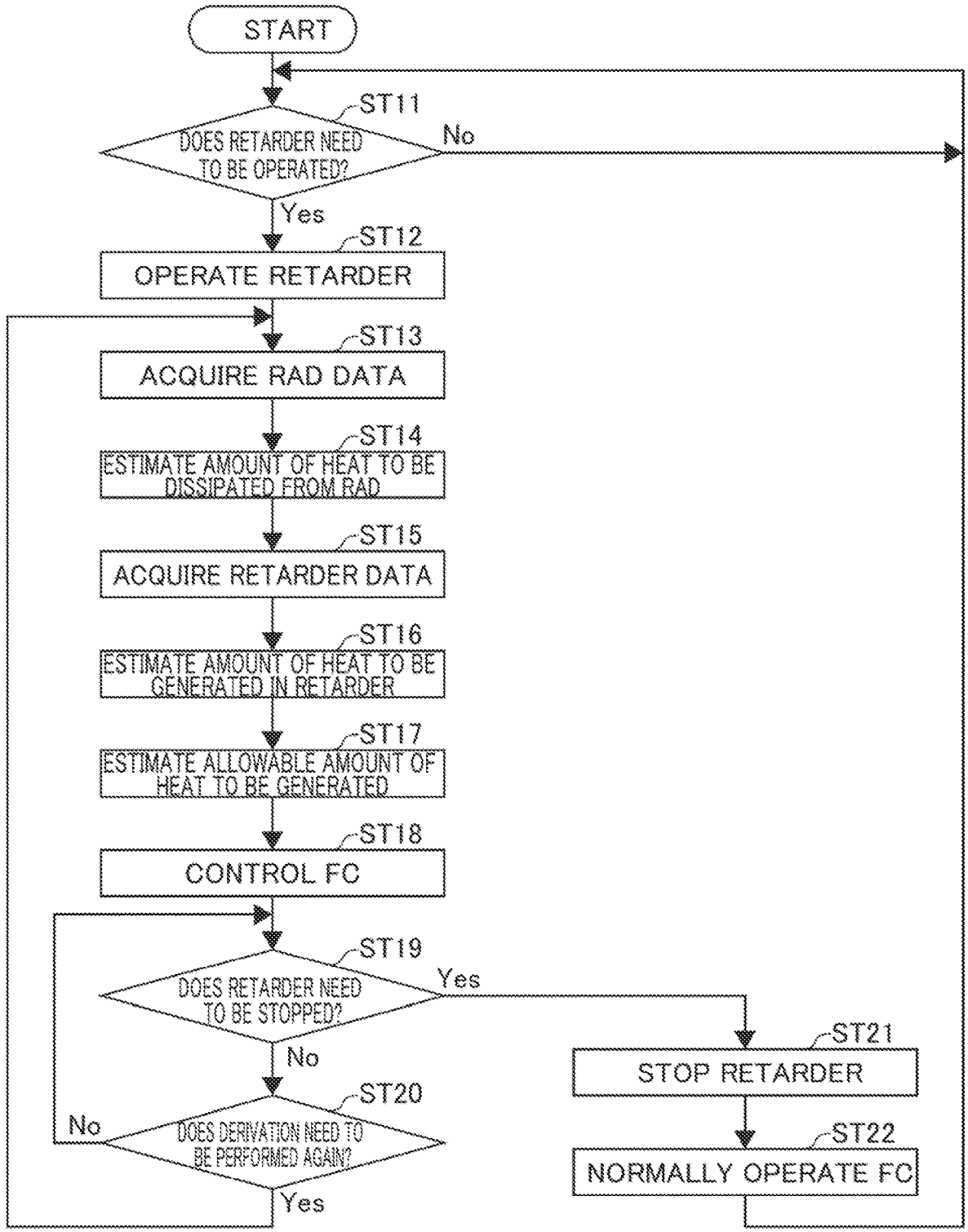
FIG. 3 is a flowchart illustrating an example of processing performed by a processor of a controller illustrated in FIG. 1.

How the motor vehicle 1 according to the embodiment operates will now be described herein with reference to FIG. 3 and other drawings. Note that the content of the processing in the below operational description is a mere example. It is possible to appropriately utilize various types of processing that makes it possible to acquire similar results. FIG. 3 is a flowchart illustrating an example of processing performed by the processor 101 of the controller 100. The processor 101 executes, for example, the processing illustrated in FIG. 3 based on the programs stored in the ROM 102, the auxiliary storage device 104, or another storage device. Note that each amount of heat described below is represented in terms of watt or another unit that is identical in dimension to watt.

As the motor vehicle 1 starts, for example, the processor 101 starts the processing illustrated in FIG. 3. At step ST11, the processor 101 determines whether the processor 101 causes the retarder 250 to operate. For example, when it is necessary to brake the motor vehicle 1, the processor 101 determines to cause the retarder 250 to operate. When the processor 101 has determined to not cause the retarder 250 to operate, the processor 101 determines No at step ST11, and repeats step ST11 in the processing. When the processor 101 has determined to cause the retarder 250 to operate, the processor 101 then determines Yes at step ST1l, and proceeds to step ST12.

At step ST12, the processor 101 causes the retarder 250 to operate.

At step ST13, the processor 101 acquires data (This will be hereinafter referred to as "RAD data".) used to estimate an amount of heat to be dissipated from the radiator 220. The RAD data includes, for example, a rotating speed of a fan of the radiator 220, a temperature of the cooling fluid entering the radiator 220, an outside temperature, an output of the water pump, and a speed of the motor vehicle 1. Note that the processor 101 acquires, for example, the rotating speed of the fan of the radiator 220 and the temperature of the cooling fluid entering the radiator 220 from the radiator 220. Furthermore, the processor 101 acquires the outside temperature from a temperature sensor configured to measure the outside temperature, for example. Note that the outside temperature may represent a temperature of air outside a vehicle body of the motor vehicle 1 or a temperature outside the radiator in the vehicle body of the motor vehicle 1. Furthermore, the processor 101 acquires the output of the water pump from the water pump, for example. Furthermore, the processor 101 acquires the speed of the motor vehicle 1 from a speedometer, for example.

At step ST14, the processor 101 uses the RAD data acquired at step ST13 to estimate an estimated value of an amount of heat to be dissipated from the radiator 220 (This will be hereinafter referred to as an "estimated value of an amount of heat to be dissipated".). For this purpose, the processor 101 acquires a speed of wind passing through the radiator 220 (a speed of wind) from the rotating speed of the fan of the radiator 220 and the speed of the motor vehicle 1, for example. The processor 101 then uses, for example, the speed of wind, the temperature of the cooling fluid entering the radiator 220, the outside temperature, and the output of the water pump to acquire an estimated value of an amount of heat to be dissipated from the radiator 220. The amount of heat to be dissipated represents a maximum amount of heat, to which the radiator 220 is able to dissipate heat in a present environment. If such a state continues that an amount of heat transferred to the radiator 220 exceeds the maximum value, temperatures in the radiator 220, the cooling circuit 210, and other components rise continuously. The temperatures in the radiator 220, the cooling circuit 210, and other components may eventually exceed the maximum value, possibly resulting in an abnormality.

At step ST15, the processor 101 acquires data used to estimate an amount of heat to be generated in the retarder 250 (This will be hereinafter referred to as "retarder data".). The retarder data includes, for example, a temperature of the retarder 250 and the outside temperature. The retarder data otherwise includes a required output for the retarder 250. The retarder data otherwise includes a speed of the motor vehicle 1, a deceleration G force, and a brake request. The retarder data otherwise includes a temperature of the cooling fluid exiting the retarder 250. The retarder data otherwise includes some of those described above. The processor 101 acquires the temperature of the retarder 250 from the retarder 250 or a temperature sensor, for example. The temperature of the retarder 250 represents a temperature of oil in the retarder 250, for example. The processor 101 acquires a required output from the retarder 250, for example. The deceleration G force represents a degree of acceleration applied to the motor vehicle 1. The processor 101 acquires the deceleration G force from an acceleration meter, for example. The brake request represents a magnitude of braking (a braking force) required in accordance with a brake-opening degree based on an operation of an operator of the motor vehicle 1, for example. The processor 101 uses a brake-opening degree, for example, to acquire the brake request. The processor 101 acquires, from the cooling circuit 210, a temperature of the cooling fluid exiting the retarder 250, for example.

At step ST16, the processor 101 uses the retarder data acquired at step ST15 to acquire an estimated value of an amount of heat to be generated in the retarder 250 (This will be hereinafter referred to as an "estimated value of an amount of heat to be generated".).

At step ST17, the processor 101 acquires an estimated value of an allowable amount of heat to be generated. The allowable amount of heat to be generated represents an available heat dissipation capacity of the radiator 220, and the maximum amount at which the FCS 230 is able to generate heat. The processor 101 acquires an allowable amount of heat to be generated by subtracting, for example, from the estimated value of the amount of heat to be dissipated, which is acquired at step ST14, the estimated value of the amount of heat to be generated, which is acquired at step ST16. The processor 101 may otherwise regard, as an allowable amount of heat to be generated, a value acquired by further subtracting a margin from a value acquired by subtracting an estimated value of an amount of heat to be generated from an estimated value of an amount of heat to be dissipated.

At step ST18, the processor 101 starts such a control that causes a total amount of heat to be generated in the fuel cell stack 233 to be equal to or below the allowable amount of heat to be generated, which is acquired at step ST17. Note that, when the processor 101 has already started the control, the processor 101 changes the control to another control that is based on a latest allowable amount of heat to be generated. The processor 101 uses, for example, any of the methods (1) to (3) described below to control each of the FCSS 230 to allow a total amount of heat to be generated in the fuel cell stacks 233 to be equal to or below an allowable amount of heat to be generated.

Note that, to reduce a total amount of heat to be generated in the fuel cell stacks 233, the processor 101 needs to reduce a total output of the fuel cell stacks 233. At this time, the processor 101 causes one or more of the fuel cell stacks 233, which has a smaller degree of or have smaller degrees of deterioration, to stop operating (to be in an idle state) in a prioritized manner to reduce a total output of the fuel cell stacks 233. For example, the processor 101 causes the fuel cell stacks 233 to stop operating in order from the fuel cell stack 233 having a smallest degree of deterioration to reduce a total output of the fuel cell stacks 233. For example, how long the fuel cell stack 233 has been operated in hours represents a degree of deterioration in the fuel cell stack 233. The processor 101 may otherwise suppress outputs of the fuel cell stacks 233, without causing the fuel cell stacks 233 to stop operating, to reduce a total amount of heat to be generated in the fuel cell stacks 233.

Furthermore, to cause one or more of the fuel cell stacks 233, which has a smaller degree of or have smaller degrees of deterioration, to stop operating in a prioritized manner, the processor 101 suppresses electrical power to be consumed in an identical one of the power supply groups 300, which includes the one or more of the fuel cell stacks 233, which has a smaller degree of or have smaller degrees of deterioration. For this purpose, for example, the processor 101 reduces an output of the motor 305 in the identical one of the power supply groups 300, but increases an output of the motor 305 in another one of the power supply groups 300. For example, when the number of the fuel cell stacks 233 that are operating in the power supply group 300a is represented by Na, and the number of the fuel cell stacks 233 that are operating in the power supply group 300b is represented by Nb, the processor 101 causes an output of the motor 305a to be approximately (Na/Nb) times of an output of the motor 305b.

The processor 101 may otherwise estimate an expected life of each component, and may determine, based on the expected life, how much outputs of the motors 305 will have to be. For example, it is assumed in here that a ratio between an output of the motor 305a and an output of the motor 305b is represented by α:(1−α). The processor 101 causes a value of α to change variously, for example, to estimate an expected life of each component per output. The processor 101 changes the value of α in a stepwise manner by an increment of 0.01, as an example, to estimate an expected life of each component per output. As for the method of estimating an expected life of a component, an example will now be described with reference to motor oil.

To estimate an expected life of a component, a deterioration index indicating a magnitude of deterioration of the component is used, for example. A deterioration index for motor oil is viscosity of the motor oil, for example. As the motor oil deteriorates, its viscosity lowers. It is therefore indicated that the more the viscosity lowers, the more the motor oil is deteriorated. It is possible to indicate the viscosity with a mathematical function of an output of the motor 305 and a period of operation time of the motor 305. Through experiments or simulations, for example, a relationship between time and viscosity regarding the motor 305 when an output of the motor 305 is set constant is acquired beforehand for various outputs. Therefore, it is possible to acquire a mathematical function indicating a relationship among viscosity, an output of the motor 305, and an elapsed period of time. The mathematical function may be represented in the form of a table or a numerical expression, for example. The auxiliary storage device 104 or another storage device is caused to store the mathematical function beforehand. In the case of motor oil, an expected life is reached when the viscosity is at a value equal to or below a predetermined minimum value. Therefore, when the motor 305 is operated at a constant output, it is possible to acquire an expected life of a component when it is possible to acquire a present deterioration index and the minimum value or the maximum value, which indicates the expected life of the component.

An expected life of an i-th component when the n number of components each applied with a number ranging from 1 to n is in here defined as Rt_i(Pw_j_i). A mathematical function of Pw_j_i is represented by Rt_i. An output of the motor 305, which determines an expected life of the i-th component, is represented by Pw_j_i. The motor 305 represents the motor 305 in an identical one of the power supply groups, which includes the component, for example. Note that i represents an integer equal to or above 1 and equal to or below n. Furthermore, an expected life of a component group including all the n number of components is represented by Rt_all(Pw_j). An output of each of all the motors 305 is represented by Pw_j. When an output of the motor 305 is represented by Pw_j, an output of the motor 305 in an identical one of the power supply groups, which includes the i-th component, is represented by Pw_j_i. Furthermore, a mathematical function of Pw_j is represented by Rt_all. Furthermore, it is possible to represent Rt_all(Pw_j) with the below equation (1).

$$Rt\_all(Pw\_j) = \min(i=1 \text{ to } n)(Rt\_i\_j(Pw\_j\_i)) \tag{1}$$

The equation (1) indicates that the expected life of the component group when each of the motors 305 is operated at an output represented by Pw_j is equal to a shortest expected life among expected lives of the n number of components when each of the motors 305 is operated at the output represented by Pw_j. The processor 101 variously changes Pw_*j to acquire Rt_all(Pw_j) to search for Pw_j when the expected life of the component group becomes longest. However, since the processor 101 normally performs the search by using Pw_j as a discrete value, it is not necessary to strictly acquire Pw_j when the expected life of the component group becomes longest. That is, it is enough that the processor 101 acquires Pw_j when the expected life of the component group becomes longest, among values of Pw_j serving as discrete values. Furthermore, if a period of processing time is not enough, for example, the processor 101 may acquire Pw_j when the expected life of the component group becomes longest, among those that have been able to be acquired within the period of time. By acquiring Pw_j as described above, the processor 101 is able to acquire a described above. Note that, even when the number of motors 305 is three or more, the processor 101 is able to similarly acquire a ratio of outputs of the motors 305.

Note that the processor 101 is able to acquire, from an output of the motor 305, respective outputs of the FCS 230 and the battery 302 in an identical one of the power supply groups, which includes the motor 305. For example, the processor 101 acquires respective outputs of the FCS 230 and the battery 302 from an output of the motor 305 and a state of charge (SOC) of the battery 302. The processor 101 acquires an expected life of a component in the FCS 230 by using an output, acquired as described above, of the FCS 230. Furthermore, the processor 101 acquires an expected life of a component in the battery 302 by using an output, which is acquired as described above, of the battery 302.

A deterioration index for the fuel cell stack 233 represents, for example, an amount of hydrogen to be supplied, an output voltage with respect to an output current, or electrical power. As for the deterioration of the fuel cell stack 233, actually measuring or acquiring, through a simulation, data of a deterioration index over time when a constant output is continuously maintained makes it possible to acquire a deterioration index for the fuel cell stack 233 as a mathematical function of an output of the fuel cell stack 233 and time. By using such a mathematical function as described above, it is possible to estimate a period of time in hours after which a deterioration index reaches the minimum value when an output at which the fuel cell stack 233 is currently requested is continuously maintained. By using such a deterioration index as described above, for example, the processor 101 is able to acquire an expected life of the fuel cell stack 233.

(1) The processor 101 acquires an allowable output from an allowable amount of heat to be generated. The allowable output represents the maximum output electrical power, at which an amount of heat to be generated in the fuel cell stack 233 is equal to or below an allowable amount of heat to be generated. When total output electrical power of the fuel cell stacks 233 exceeds the allowable output, the processor 101 then controls each of the FCSs 230 to allow the total output electrical power of the fuel cell stacks 233 to be equal to or below the allowable output. Preferably, when total output electrical power of the fuel cell stacks 233 exceeds an allowable output, the processor 101 controls each of the FCSs 230 to allow the total output electrical power of the fuel cell stacks 233 to be a value equal to or above a value smaller, by a predetermined value, than the allowable output and equal to or below the allowable output. More preferably, when total output electrical power of the fuel cell stacks 233 exceeds an allowable output, the processor 101 controls each of the FCSS 230 to allow the total output electrical power of the fuel cell stacks 233 to be a value equal to the allowable output. Note that, to increase the total output electrical power of the fuel cell stacks 233, the processor 101 controls each of the FCSs 230 to increase the output electrical power to an allowable output serving as the maximum value.

(2) The processor 101 acquires an allowable current from an allowable amount of heat to be generated. The allowable current represents the maximum output current, at which an amount of heat to be generated in the fuel cell stacks 233 is equal to or below an allowable amount of heat to be generated. When a total output current of the fuel cell stacks 233 exceeds an allowable current, the processor 101 then controls each of the FCSs 230 to allow the total output current of the fuel cell stacks 233 to be equal to or below the allowable current. Preferably, when a total output current of the fuel cell stacks 233 exceeds an allowable current, the processor 101 controls each of the FCSs 230 to allow the total output current of the fuel cell stacks 233 to be a value equal to or above a value smaller, by a predetermined value, than the allowable current and equal to or below the allowable current. More preferably, when a total output current of the fuel cell stacks 233 exceeds an allowable current, the processor 101 controls each of the FCSs 230 to allow the total output current of the fuel cell stacks 233 to be a value equal to the allowable current. Note that, to increase a total output current of the fuel cell stacks 233, the processor 101 controls each of the FCSs 230 to increase the allowable current to an output current serving as the maximum value.

(3) The processor 101 acquires an allowable amount of hydrogen from an allowable amount of heat to be generated. The allowable amount of hydrogen represents the maximum amount of hydrogen to be used per hour, at which an amount of heat to be generated in the fuel cell stacks 233 is to be equal to or below an allowable amount of heat to be generated. When a total amount of hydrogen to be used per hour in the fuel cell stacks 233 exceeds an allowable amount of hydrogen, the processor 101 then performs control to allow the total amount of hydrogen to be used in the fuel cell stacks 233 to be equal to or below the allowable amount of hydrogen. Preferably, when a total amount of hydrogen to be used in the fuel cell stacks 233 exceeds an allowable amount of hydrogen, the processor 101 controls each of the FCSs 230 to allow the total amount of hydrogen to be used in the fuel cell stacks 233 to be a value equal to or above a value smaller, by a predetermined value, than the allowable amount of hydrogen and equal to or below the allowable amount of hydrogen. More preferably, when a total amount of hydrogen to be used in the fuel cell stacks 233 exceeds an allowable amount of hydrogen, the processor 101 controls each of the FCSs 230 to allow the total amount of hydrogen to be used in the fuel cell stacks 233 to be a value equal to the allowable amount of hydrogen. Note that, to increase a total amount of hydrogen to be used in the fuel cell stacks 233, the processor 101 controls each of the FCSs 230 to increase an amount of hydrogen to be used to an allowable amount of hydrogen serving as the maximum value.

At step ST19, the processor 101 determines whether to cause the retarder 250 to stop operating. When it is not necessary to brake the motor vehicle 1, for example, the processor 101 determines to cause the retarder 250 to stop operating. When the processor 101 has determined to not cause the retarder 250 to stop operating, the processor 101 determines No at step ST19, and proceeds to step ST20.

At step ST20, the processor 101 determines whether to acquire again an allowable amount of heat to be generated. When a predetermined period of time has passed after the processor 101 has acquired previously an estimated value of an allowable amount of heat to be generated, for example, the processor 101 determines to acquire again an allowable amount of heat to be generated. Furthermore, for example, a value that varies in type and that indicates a state of the motor vehicle 1 or a state of an environment around the motor vehicle 1, such as a speed of the motor vehicle 1, a slope of a road on which the motor vehicle 1 is traveling, a degree of acceleration, a brake-opening degree, or an acceleration-opening degree of the motor vehicle 1, an outside temperature, or a temperature of each of the fuel cell stacks 233, changes by a predetermined amount or more or falls within a predetermined range, the processor 101 determines to acquire again an allowable amount of heat to be generated. When the processor 101 has determined to not acquire again an allowable amount of heat to be generated, the processor 101 determines No at step ST20, and returns to step ST19. As described above, the processor 101 turns into a stand-by state where step ST19 and step ST20 are repeated until the processor 101 determines to cause the retarder 250 to stop operating or determines to acquire again an allowable amount of heat to be generated.

When the processor 101 has determined to acquire again an allowable amount of heat to be generated while the processor 101 is in the stand-by state where step ST19 and step ST20 are repeated, the processor 101 determines Yes at step ST20, and returns to step ST13. As described above, the processor 101 performs step ST13 to step ST18 in the processing per a predetermined period of time or otherwise each time a value that varies in type changes by a predetermined amount or more or falls within a predetermined range.

Furthermore, when the processor 101 has determined to cause the retarder 250 to stop operating while the processor 101 is in the stand-by state where step ST19 and step ST20 are repeated, the processor 101 determines Yes at step ST19, and proceeds to step ST21. At step ST21, the processor 101 causes the retarder 250 to stop operating.

At step ST22, the processor 101 ends the control that has been started at step ST18 to allow the total amount of heat to be generated in the fuel cell stacks 233 to be equal to or below the allowable amount of heat to be generated, which has been acquired at step ST17, and causes the FCSs 230 to return to normal operation. Therefore, the maximum total amount of heat to be generated in the fuel cell stacks 233 no longer corresponds to the allowable amount of heat to be generated. After step ST22 in the processing, the processor 101 returns to step ST11.

Figure 4:
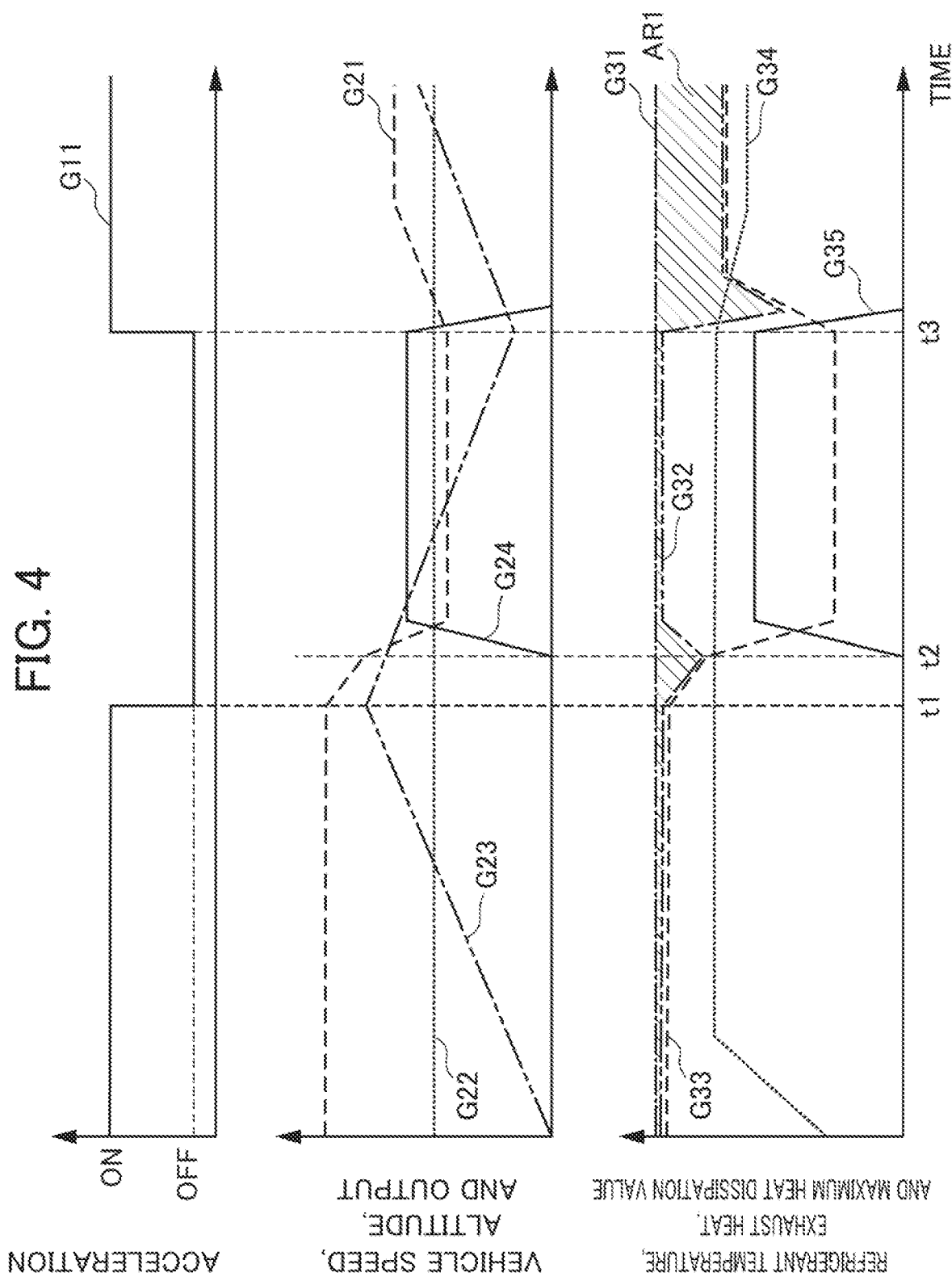
FIG. 4 illustrates graphs, as an example, of changes over time in state and others of each component of the motor vehicle according to the embodiment.

When an example of operation of the motor vehicle 1 according to the embodiment is illustrated in graphs, those as illustrated in FIG. 4 are acquired. FIG. 4 illustrates graphs, as an example, of changes over time in state and others of each component of the motor vehicle 1 according to the embodiment. Furthermore, when operation of a conventional motor vehicle is illustrated in graphs, those as illustrated in FIG. 5 are acquired. FIG. 5 illustrates graphs, as an example, of changes over time in state and others of each component of a conventional motor vehicle.

A graph G11 represents a graph illustrating acceleration that is switched between on and off. A graph G21 and a graph G21b represent graphs each illustrating a total output of the fuel cell stacks 233. A graph G22 represents a graph illustrating a speed of the motor vehicle. A graph G23 represents a graph illustrating an altitude of a road on which the motor vehicle travels. A graph G24 represents a graph illustrating a brake output of the retarder 250. A graph G31 represents a graph illustrating the maximum amount of heat to be dissipated from the radiator 220. A graph G32 and a graph G32b represent graphs each illustrating a total amount of heat acquired by adding a total amount of heat to be generated in the fuel cell stacks 233 and an amount of heat to be generated in the retarder 250. A graph G33 and a graph G33b represent graphs each illustrating a total amount of heat to be generated in the fuel cell stacks 233. A graph G34 and a graph G34b represent graphs each illustrating a temperature of the cooling fluid. A graph G35 represents a graph illustrating an amount of heat to be generated in the retarder 250. A region AR1 illustrates an available capacity with respect to an amount of heat to be dissipated from the radiator 220, which is acquired by subtracting the total amount of heat illustrated in the graph G32 from the maximum value illustrated in the graph G31. A region AR1b illustrates an available capacity with respect to an amount of heat to be dissipated from the radiator 220, which is acquired by subtracting the total amount of heat illustrated in the graph G32b from the maximum value illustrated in the graph G31.

The graphs illustrated in FIGS. 4 and 5 each illustrate an example when the motor vehicle travels an ascending slope, a descending slope, and an ascending slope in order. The motor vehicle travels the ascending slope at a slope of 5% to a time t1, travels the descending slope at a slope of 5% from the time t1 to a time t3, and travels the ascending slope at a slope of 5% after the time t3. Furthermore, in both FIGS. 4 and 5, the speed of the motor vehicle is kept constant at 50 km/s. In both FIGS. 4 and 5, acceleration is switched to on to the time t1, is switched to off from the time t1 to the time t3, and is switched to on from the time t3. Furthermore, in both FIGS. 4 and 5, the retarder 250 is caused to operate at a time t2, and then the retarder 250 is caused to stop operating at the time t3. Note that the time t2 corresponds to a time falling within a range from the time t1 to the time t3.

In the conventional motor vehicle, as illustrated in the graph G33b in FIG. 5, the fuel cell stacks 233 are caused to stop operating, and the output accordingly drops significantly. On the other hand, in the motor vehicle 1 according to the embodiment, as illustrated in the graph G33 in FIG. 4, a degree to which the output drops is smaller, compared with that of the conventional motor vehicle. Therefore, as illustrated in the region AR1 and the region AR1b, there is a smaller available capacity with respect to an amount of heat to be dissipated in the motor vehicle 1 according to the embodiment. That is, it is possible to know that the motor vehicle 1 according to the embodiment effectively uses an amount of heat to be dissipated with an available capacity with respect to an amount of heat to be dissipated, which is remaining at a minimum level.

When the motor vehicle 1 according to the embodiment causes the retarder 250 to operate, the motor vehicle 1 causes some of the fuel cell stacks 233 to stop operating. Therefore, in the motor vehicle 1 according to the embodiment, the fuel cell stacks 233 are less likely to be deteriorated, compared with conventional motor vehicles where all the fuel cell stacks 233 will be caused to stop operating. When the motor vehicle 1 according to the embodiment causes the retarder 250 to operate, the motor vehicle 1 otherwise reduces outputs of the fuel cell stacks 233 without causing the fuel cell stacks 233 to stop operating. Therefore, in the motor vehicle 1 according to the embodiment, the fuel cell stacks 233 are less likely to be deteriorated, compared with conventional motor vehicles where all the fuel cell stacks 233 will be caused to stop operating.

When the motor vehicle 1 according to the embodiment increases outputs of the fuel cell stacks 233, the motor vehicle 1 increases the outputs to allow a total amount of heat to be generated in the fuel cell stacks 233 to be equal to or below an allowable amount of heat to be generated. Therefore, the motor vehicle 1 according to the embodiment makes it possible to prevent an amount of heat to be transferred to the radiator 220 from exceeding the maximum amount of heat to be dissipated.

The motor vehicle 1 according to the embodiment represents a motor vehicle including the retarder 250 as a heat source. Therefore, the motor vehicle 1 according to the embodiment makes it possible to prevent deterioration of the fuel cell stacks 233, which may occur when the motor vehicle 1 includes the retarder 250, compared with conventional motor vehicles.

The motor vehicle 1 according to the embodiment uses retarder data to estimate an amount of heat to be generated in the retarder 250. By using the amount of heat to be generated, the motor vehicle 1 according to the embodiment makes it possible to acquire a more accurate available capacity with respect to an amount of heat to be dissipated from the radiator 220.

The motor vehicle 1 according to the embodiment uses RAD data to estimate an amount of heat to be dissipated from the radiator 220. By using the amount of heat to be dissipated, the motor vehicle 1 according to the embodiment makes it possible to acquire a more accurate available capacity with respect to an amount of heat to be dissipated from the radiator 220.

The motor vehicle 1 according to the embodiment causes one or more of the fuel cell stacks 233, which has a smaller degree of or have smaller degrees of deterioration, to stop operating in a prioritized manner. Therefore, the motor vehicle 1 according to the embodiment makes it possible to prevent one or more of the fuel cell stacks 233, which has a larger degree of or have larger degrees of deterioration, from deteriorating, by causing the one or more of the fuel cell stacks 233 to stop operating.

The motor vehicle 1 according to the embodiment reduces an output of the motor 305 in an identical one of the power supply groups, which includes the one or more of the fuel cell stacks 233, which is or are caused to stop operating, than outputs of the others of the power supply groups. Therefore, even in one of the power supply groups, where one or more of the fuel cell stacks 233 is or are caused to stop operating, it is possible to allow the motor 305 to operate normally.

The motor vehicle 1 according to the embodiment determines an output of the motor to allow an expected life of a component group including a plurality of components to be longest. Therefore, the motor vehicle 1 according to the embodiment makes it possible to extend a period of time until one of components reaches its expected life.

It is possible to modify the embodiment described above as described below. Instead of acquiring an estimated value of an amount of heat to be generated, the processor 101 may acquire an amount of heat to be generated in the retarder 250, which is measured by using a temperature sensor, for example. The processor 101 then acquires an allowable amount of heat to be generated by subtracting, for example, the amount of heat to be generated from the estimated value of the amount of heat to be dissipated, which is acquired at step ST14.

Instead of acquiring an estimated value of an amount of heat to be generated, the processor 101 may acquire a present amount of heat dissipated from the radiator 220. For example, the processor 101 acquires the measured amount of dissipated heat. The processor 101 then acquires an allowable amount of heat to be generated by subtracting, for example, the measured amount of dissipated heat from the estimated value of the amount of heat to be dissipated, which is acquired at step ST14.

The motor vehicle 1 according to the embodiment described above uses the cooling circuit 210 and the radiator 220 to cool the fuel cell stacks 233 and the retarder 250. However, the motor vehicle according to the embodiment may use the cooling circuit 210 and the radiator 220 to cool other devices, in addition to the fuel cell stack 233 and the retarder 250. In this case, the processor 101 acquires an estimated value of a total amount of heat to be generated in the retarder 250 and the devices, as an estimated value of an amount of heat to be generated. Furthermore, the motor vehicle according to the embodiment may use the cooling circuit 210 and the radiator 220 to cool other devices than the fuel cell stack 233 and the retarder 250. In this case, the processor 101 acquires an estimated value of an amount of heat to be generated in the devices, as an estimated value of an amount of heat to be generated. The target devices that the cooling circuit 210 and the radiator 220 cool represent an example of a heat source.

The motor vehicle 1 according to the embodiment described above is applied with a water-cooled style, where the cooling circuit 210, the radiator 220, and a liquid are used to cool the fuel cell stacks 233 and the retarder 250. However, the motor vehicle according to the embodiment may be applied with an air-cooling style to perform cooling, instead of a water-cooling style. An air-cooled motor vehicle uses, for example, a heat sink and a cooling fan to perform cooling. The heat sink and the cooling fan, for example, represent an example of a heat dissipator.

The above embodiment has been described with reference to a motor vehicle as an example. However, it is possible to apply the electrical power system according to the embodiment to those other than motor vehicles, such as those vehicles or unattended machines that use fuel cells as a driving power source. For example, it is possible to apply the electrical power system according to the embodiment to airplanes, ships and vessels, submarines, or railroad vehicles that use fuel cells as a driving power source, for example. Furthermore, it is possible to apply the electrical power system according to the embodiment to other machines than vehicles and unattended machines, such as stationary systems including electrical power generation facilities and cogeneration systems, and robots.

The processor 101 may be one where a part or a whole of the processing achieved by the programs in the embodiment described above is achieved by a circuit hardware configuration.

The programs that achieve the processing according to the embodiment are transferred in a state where the programs are stored in a device, for example. However, the device may be transferred in a state where the programs are not stored. The programs may then be separately transferred, and written into the device. It is possible to achieve the transferring of the programs at this time in such a manner that the programs are recorded in a removable storage medium, or otherwise the programs are downloaded via a network such as the Internet or a local area network (LAN), for example.

Although the embodiment of the present invention has been described, the illustrated embodiment is a mere example and is not intended to limit the scope of the present invention. It is possible to implement the embodiment of the present invention in various aspects without departing from the gist of the present invention.

EXPLANATION OF REFERENCE NUMERALS

1 MOTOR VEHICLE
100 CONTROLLER
101 PROCESSOR
102 ROM
103 RAM
104 AUXILIARY STORAGE DEVICE
200 COOLING UNIT
210 COOLING CIRCUIT
220 RADIATOR
230 FCS

231 THERMOSTAT VALVE
232, 240 WATER PUMP
233 FUEL CELL STACK
234 TEMPERATURE SENSOR
250 RETARDER
300a, 300b POWER SUPPLY GROUP
301 FCVCU
302 BATTERY
303 BATVCU
304 PDU
305a, 305b MOTOR
306a, 306b AUXILIARY DEVICE
400 DRIVE SYSTEM

What is claimed is:

1. An electrical power system comprising:
a fuel cell configured to generate electrical power through electrochemical reactions to generate first heat;
a retarder serving as a heat source that operates to generate second heat;
a heat dissipator configured to dissipate the first heat and the second heat; and
a controller configured to control to reduce an output without causing the fuel cell to stop operating so as to allow, when the heat source is in operation, an amount of the first heat to be equal to or below an available heat dissipation capacity acquired by subtracting an amount of the second heat from a maximum amount of heat to be dissipated from the heat dissipator.

2. The electrical power system according to claim 1, wherein
the electrical power system is mounted on a motor vehicle.

3. The electrical power system according to claim 2, wherein the amount of the second heat is acquired based on at least either
a temperature of the retarder and an outside temperature,
a required output for the retarder,
a temperature of a cooling fluid exiting the retarder, or
a speed of the motor vehicle, a degree of acceleration, and a brake request.

4. The electrical power system according to claim 1, wherein
the heat dissipator includes a radiator, and
the maximum amount is acquired based on
a speed of wind passing through the radiator,
a temperature of a cooling fluid entering the radiator,
an outside temperature, and
an output of a water pump configured to accelerate the cooling fluid.

5. The electrical power system according to claim 1, wherein
a plurality of the fuel cells are included,
the first heat represents total heat that the plurality of fuel cells generate, and
the controller causes an output or outputs of one or more of the fuel cells, the one or more of the fuel cells each having a smaller degree of deterioration, to be reduced in a prioritized manner to cause the amount of the first heat to be equal to or below the available heat dissipation capacity.

6. The electrical power system according to claim 5, further comprising a plurality of loads that operate with electrical power generated by the fuel cells,
wherein the controller causes an output or outputs of one or more of the loads in an identical one of power supply groups, the identical one of the power supply groups including one or more of the fuel cells, an output or outputs of the one or more of the fuel cells being caused to be reduced, to be each smaller than each of outputs of the loads in another one of the power supply groups.

7. The electrical power system according to claim 1, further comprising a plurality of loads that operate with electrical power generated by the fuel cell,
wherein the controller determines outputs of the loads to allow an expected life of a component group including a plurality of components to be longest.

8. The electrical power control device according to claim 1, wherein, when the heat source stops operating, the controller is configured to control to stop the control to allow the amount of the first heat to be equal to or below the available heat dissipation capacity.

9. An electrical power control device comprising a controller configured to control to reduce an output without causing a fuel cell to stop operating so as to allow, when a retarder serving as a heat source that operates to generate second heat is in operation, an amount of first heat that the fuel cell generates through electrochemical reactions to be equal to or below an available heat dissipation capacity acquired by subtracting an amount of the second heat from a maximum amount of heat to be dissipated from a heat dissipator configured to dissipate the first heat and the second heat.

* * * * *